United States Patent
Yang et al.

(10) Patent No.: US 9,064,511 B1
(45) Date of Patent: Jun. 23, 2015

(54) REMOVABLE HARD DRIVE STORAGE DEVICE

(71) Applicant: ECHOSTREAMS INNOVATIVE SOLUTIONS, LLC, Arcadia, CA (US)

(72) Inventors: Chin-Hao Yang, New Taipei (TW); Chang-Feng Chu, New Taipei (TW); Gene Jingluen Lee, New Taipei (TW)

(73) Assignee: ECHOSTREAMS INNOVATIVE SOLUTIONS, LLC, Arcadia, CA (US)

( * ) Notice: Subject to any disclaimer, the term of this patent is extended or adjusted under 35 U.S.C. 154(b) by 0 days.

(21) Appl. No.: 14/628,225

(22) Filed: Feb. 21, 2015

(30) Foreign Application Priority Data

Oct. 31, 2014 (TW) .............................. 103219372 U

(51) Int. Cl.
  *G11B 5/39* (2006.01)
(52) U.S. Cl.
  CPC ........................................ *G11B 5/39* (2013.01)
(58) Field of Classification Search
  CPC ............. G11B 15/6835; G11B 17/225; G11B 15/689; G11B 15/68; G11B 17/22; G11B 15/6885; G11B 15/688; G11B 23/0236; G11B 15/6825
  USPC ........................................................ 360/92.1
  See application file for complete search history.

(56) References Cited

U.S. PATENT DOCUMENTS

| | | | |
|---|---|---|---|
| 5,940,354 A * | 8/1999 | Inoue .......................... | 369/30.43 |
| 7,230,792 B2 * | 6/2007 | Schmidtke et al. ......... | 360/98.06 |
| 8,346,386 B2 * | 1/2013 | Jesionowski et al. ......... | 700/214 |

* cited by examiner

*Primary Examiner* — Mark Blouin
(74) *Attorney, Agent, or Firm* — Li & Cai Intellectual Property (USA) Office

(57) ABSTRACT

A removable hard drive storage device comprises: a housing having a first and second partition board each formed with a plurality of guiding grooves; a plurality of hard drive casings accommodated between the first and second partition boards. Each of the hard drive casings has a first side plate and a second side plate whose surfaces are each formed with a plurality of guiding units slidably disposed in the guiding grooves. Upper ends of the first and second side plates are each formed with an expansion unit for engaging the upper edges of the first and second partition boards, fixing the hard drive casing at a raised position in the accommodating space. Through the above structure, the hard drive casing can be fixed at the raised position in the accommodating space without separating from the housing for facilitating replacement of the hard drive and without using screws.

15 Claims, 15 Drawing Sheets

REMOVABLE HARD DRIVE STORAGE DEVICE

BACKGROUND OF THE INVENTION

1. Field of the Invention

The present disclosure relates to a removable hard drive storage device; in particular, to a removable hard drive storage device applicable to servers, drive arrays, external hard drives, network attached storages (NAS), and other such storage devices.

2. Description of Related Art

Storage devices such as servers, hard drive arrays, external hard drives, and network attached storages on the current market typically have removable structures. A conventional storage device has a housing, at least one hard drive accommodating slot, and a plurality of removable hard drive casings. Each of the removable hard drive casings are formed with a sliding rail at two sides thereof, and are slidingly disposed in the hard drive accommodating slot through the sliding rails. Each of the removable hard drive casings can accommodate a hard drive therein, and each of the removable hard drive casings has a latch device for fixing the removable hard drive casing in the hard drive accommodating slot, such that the removable hard drive casing and the hard drive can be fixed in the hard drive accommodating slot of the housing.

The latch device of a conventional removable hard drive casing is usually designed to be able to be quickly removed, such that the user can quickly remove the removable hard drive casing from the hard drive accommodating slot.

However, the structures of the sliding rails and the latch devices of a conventional removable hard drive casing are very complicated, therefore increasing the production cost. Also, a conventional removable hard drive casing usually fixes a hard drive therein by screws. Therefore, screwdrivers are required to separate the hard drive from the removable hard drive casing. In order to avoid being blocked by other removable hard drive casings or the housing when disengaging the screws, the entire removable hard drive casing needs to be removed from the housing. Therefore, in the process of removing and adding hard drives, the removable hard drive casing is separated from the hard drive accommodating slot and reinserted into the hard drive accommodating slot afterwards. However, during removal and reinsertion of the removable hard drive casing, components may be lost, and the sliding rails may be damaged, therefore resulting in disadvantages of the conventional removable storage device during operation.

Moreover, hard drives are usually fixed in the removable hard drive casings by screws. Therefore, when removing the hard drives, time is consumed for turning the screws. In the past, the quantity of hard drives accommodated in a removable storage device has not been very high, so time spent on screwing and unscrewing the screws is not overwhelmingly high. However, with ever increasing demand for high storage space, servers, removable hard drives, hard drive arrays and other storage devices on the current market employ a continually increasing quantity of hard drives. Therefore when replacing hard drives, the amount of time required of the user is overwhelmingly high.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a removable hard drive storage device which can solve the problem of having to remove removable casings from housings when replacing hard drives in conventional hard drive storage devices.

Another object of the present disclosure is to provide a removable hard drive storage device which can solve the problem of time consumption on removing hard drives from conventional removable hard drive storage devices which use screws to fix the hard drives.

In order to achieve the aforementioned objects, the present disclosure provides a removable hard drive storage device, comprising: a housing, at least one first partition board, at least one second partition board, at least one accommodating space, and a plurality of hard drive casings.

The first partition board and the second partition board are parallel and together define the accommodating space. A plurality of hard drive casings are slidably accommodated in the accommodating space. Each of the hard drive casings in turn accommodates one hard drive. Each of the hard drive casings has a tray, and a first side plate and a second side plate positioned respectively at two sides of the tray. The tray, the first side plate and the second side plate define a hard drive accommodating slot. A plurality of guiding units protrude from the outer faces of the first side plate and the second side plate. A plurality of guiding grooves are formed on the first partition board and the second partition board at positions corresponding to the guiding units. The guiding units are respectively slidably engaged to the guiding grooves. A plurality of expansion units are disposed at the first side plate and the second side plate above the respective guiding units. A lower end of each of the expansion units is connected to an outer surface of the first side plate or the second side plate. Another end of the expansion unit points upward and slantedly extends away from the surface of the first side plate or the second side plate.

The expansion units have elasticity. When the hard drive casing is ejected from the accommodating space such that the height of the expansion units is greater than the height of the top edges of the first partition board and the second partition board, the expansion units elastically expand outward and abut the top edges of the first partition board and the second partition board, to prevent the hard drive casing from sliding downward.

A cover plate is disposed at an opening of the hard drive casing. One end of the cover plate is pivotally connected to an upper end of the first side plate or the second side plate. Two ends of the cover plate are formed respectively with a first engagement portion and a slidable second engagement portion. A plurality of engagement holes are formed at positions on the top edges of the first partition board and the second partition board corresponding to the first engagement portion and the second engagement portion, for engaging the first engagement portion and the second engagement portion, thereby fixing the hard drive casing and fixing the cover plate at the top opening of the hard drive casing.

A plurality of elastic pieces can be disposed at inner faces of the first side plate and the second side plate of the hard drive casing. Each of the elastic pieces has a fixing protrusion positioned at locations corresponding to a position of a respective screw hole at a side face of the hard drive accommodated in the hard drive accommodating slot, for fixing the hard drive in the hard drive accommodating slot.

The present disclosure has the following advantages. The hard drive can be fixed in the hard drive casing without using screws. When removing the hard drive, the hard drive casing is not completely separated from the accommodating space of the housing, and can be positioned at an upper portion of the same, for facilitating replacement of hard drives.

In order to further the understanding regarding the present disclosure, the following embodiments are provided along with illustrations to facilitate the disclosure of the present disclosure.

DETAILED DESCRIPTION OF THE PREFERRED EMBODIMENTS

First Embodiment

Figure 1:
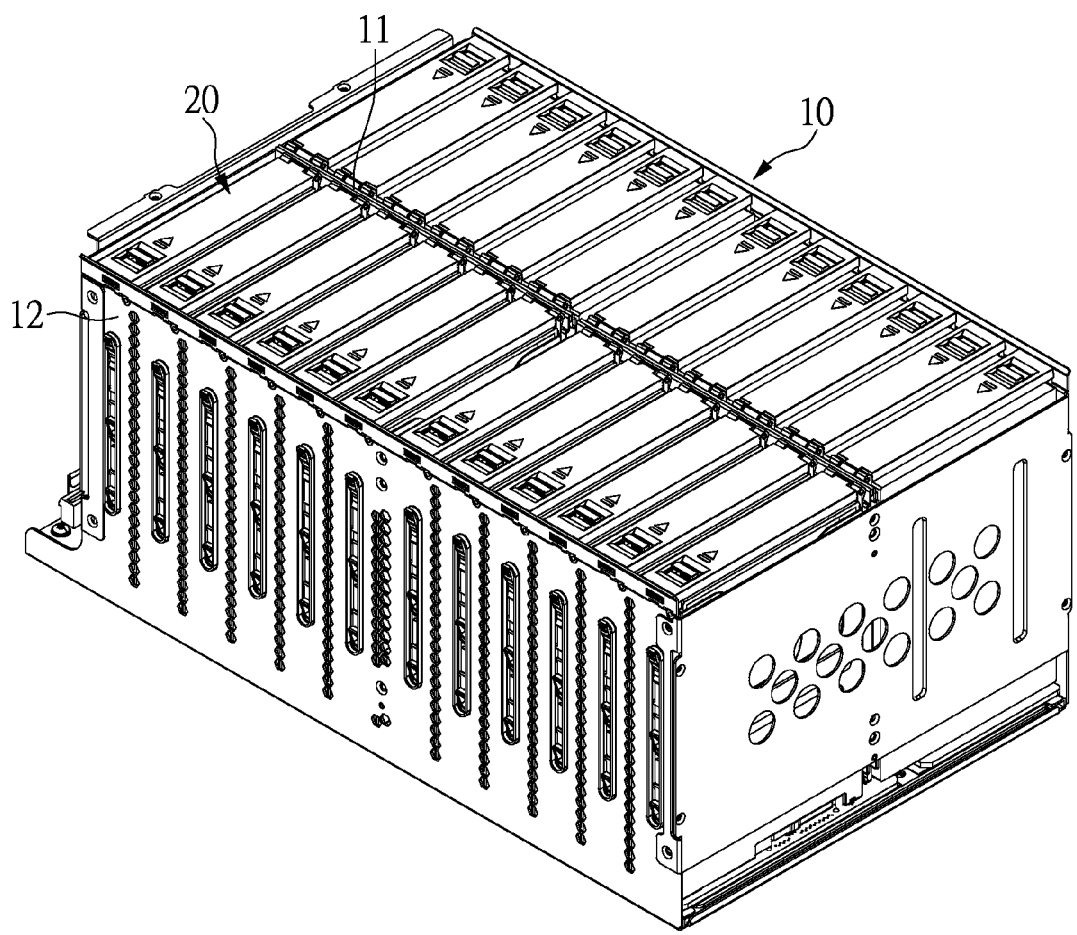
FIG. 1 shows a perspective view of an assembled removable hard drive storage device according to the present disclosure.
Figure 2:
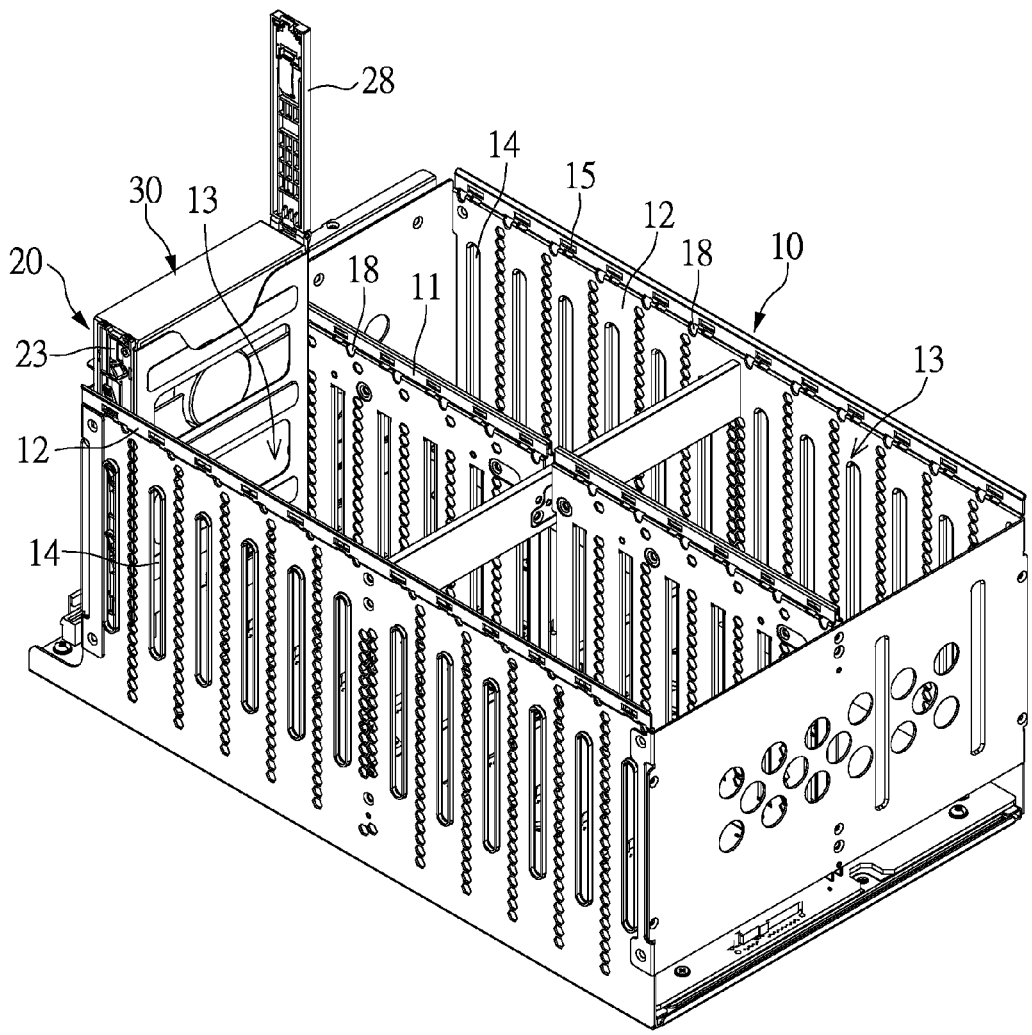
FIG. 2 shows a perspective view of a removable hard drive storage device accommodating only one hard drive casing according to the present disclosure.

As shown in FIG. 1 and FIG. 2 the removal hard drive storage device of the present disclosure can be applied to a hard drive array of a server. The removable hard drive storage device of the present disclosure mainly comprises: a housing 10, a plurality of first partition boards 11, a plurality of second partition boards 12, and a plurality of hard drive casings 20.

The plurality of hard drive casings 20 are slidably disposed in the housing 10. Each of the hard drive casing 20 can accommodate one hard drive 30, thereby removably installing the hard drives 30 in the housing 10.

As shown in FIG. 2, the housing 10 has a plurality of first partition boards 11 and a plurality of second partition boards 12. The first partition boards 11 and the second partition board 12 are parallel. The first partition boards 11 and the second partition boards 12 define an accommodating space 13 therebeteween. The hard drive casings 20 are slidably disposed in the accommodating space 13.

As shown in FIG. 2, in said embodiment, the first partition boards 11 of the housing 10 are arranged at a center position of the housing 10, and the second partition boards 12 are arranged at two sides of the housing 10. Therefore, the second partition boards 12 and the first partition boards 11 define two parallel accommodating spaces 13. The quantity and method of arrangement of the first side boards 11, the second side boards 12, and the accommodating space 13 is not limited to what is shown in the figure, and can be modified according to need.

Figure 7:
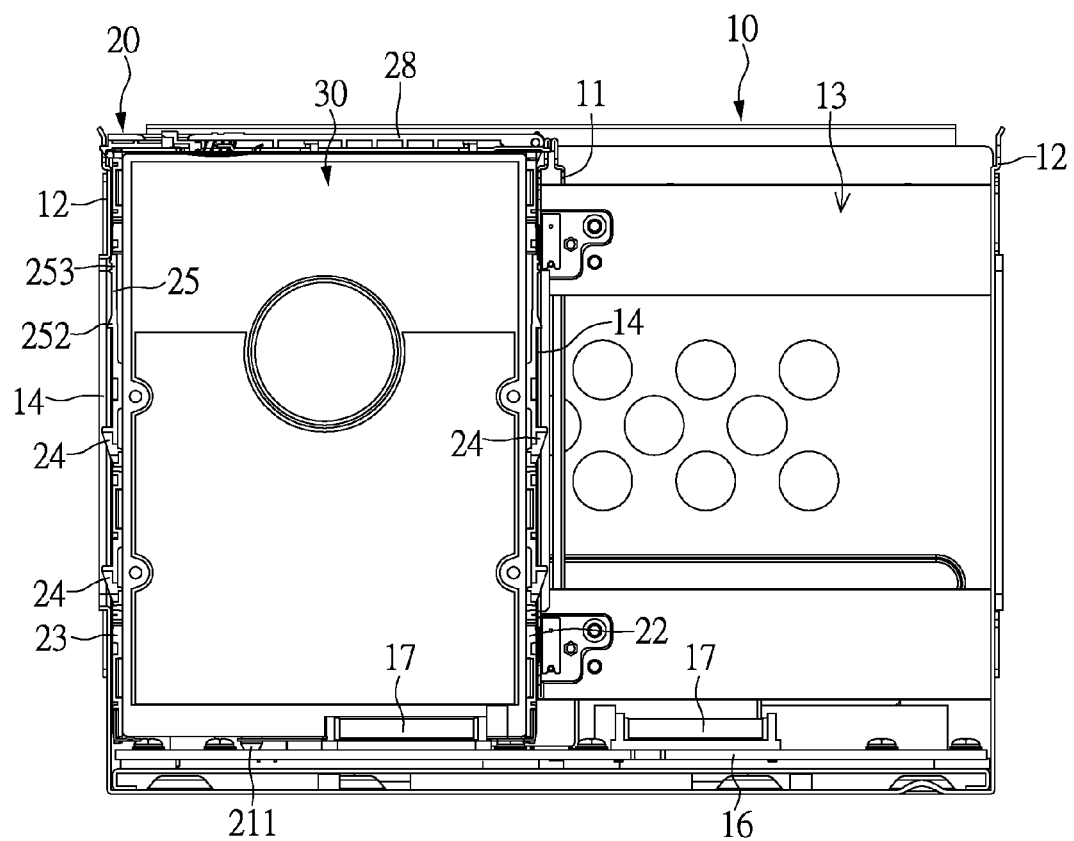
FIG. 7 shows a cross-sectional view of a hard drive casing accommodated in an accommodating space of a housing according to the present disclosure.
Figure 8:
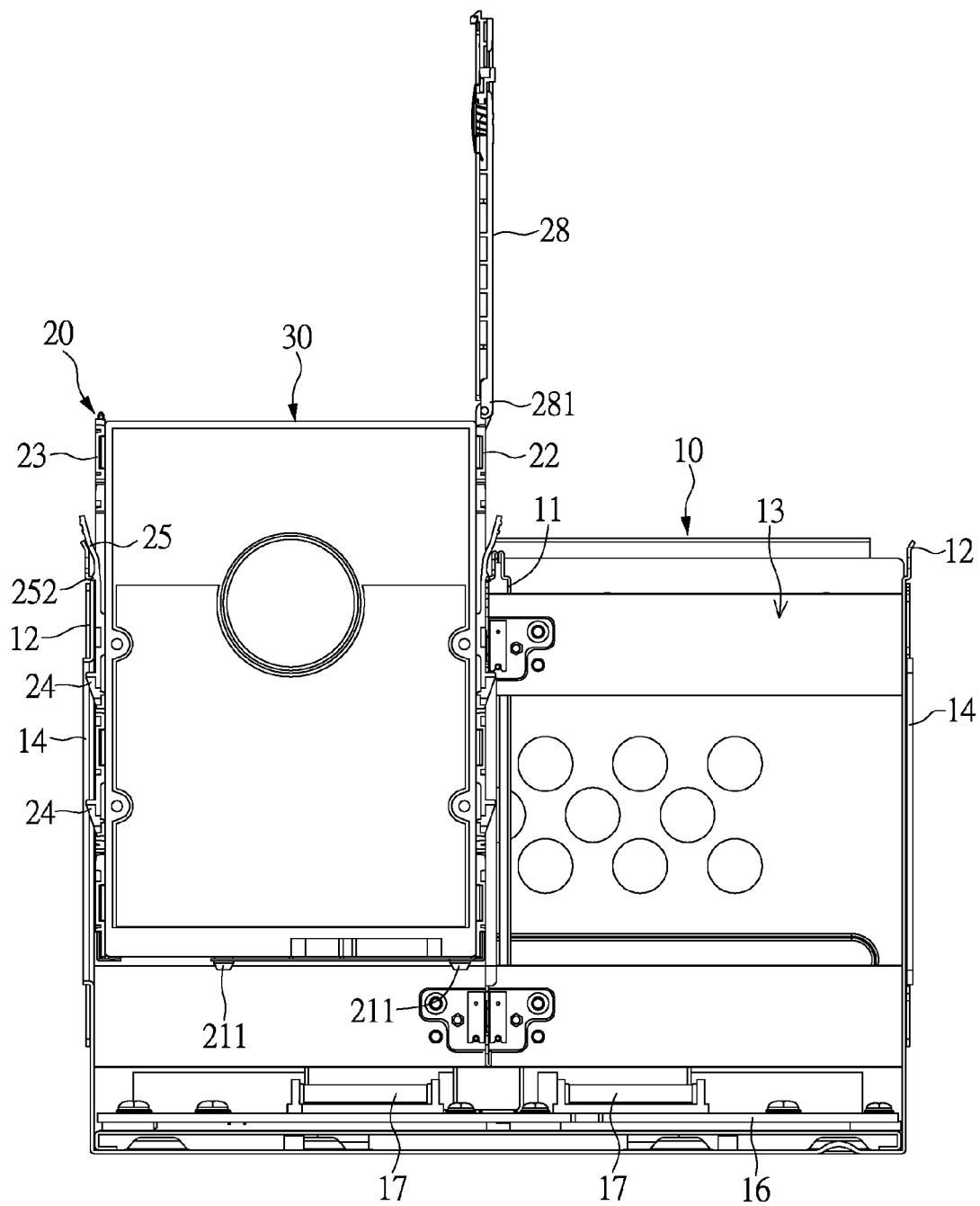
FIG. 8 shows a cross-sectional view of a hard drive casing ejected from an accommodating space of a housing according to the present disclosure.

As shown in FIG. 2, FIG. 7 and FIG. 8, the accommodating space 13 of the housing 10 has a bottom end which is closed, and an opening at another end. The hard drive casings 20 are inserted through the opening into the accommodating space 13, and can abut the bottom end 13 of the accommodating space 13. The bottom end of the accommodating space 13 has a server board 16, a connector 17, etc. (as shown in FIG. 7 and FIG. 8). When the hard drive casing 20 abuts the bottom end of the accommodating space 13, the hard drive accommodated within the hard drive casing 20 can connect to the connector 17 on the board 16, for achieving power and signal connection to the board 16.

To facilitate description, the opening end of the accommodating space 13 is defined as up in the present embodiment, and the bottom end of the accommodating space is defined as down. However, said direction is only for illustrative purposes and not for limiting the actual orientation of the present disclosure. In other words, in the present embodiment the hard drive casing 20 is described to be inserted in the housing 10 in a vertical direction, but in practice the hard drive casing 20 can also be for example inserted horizontally.

Figure 3:
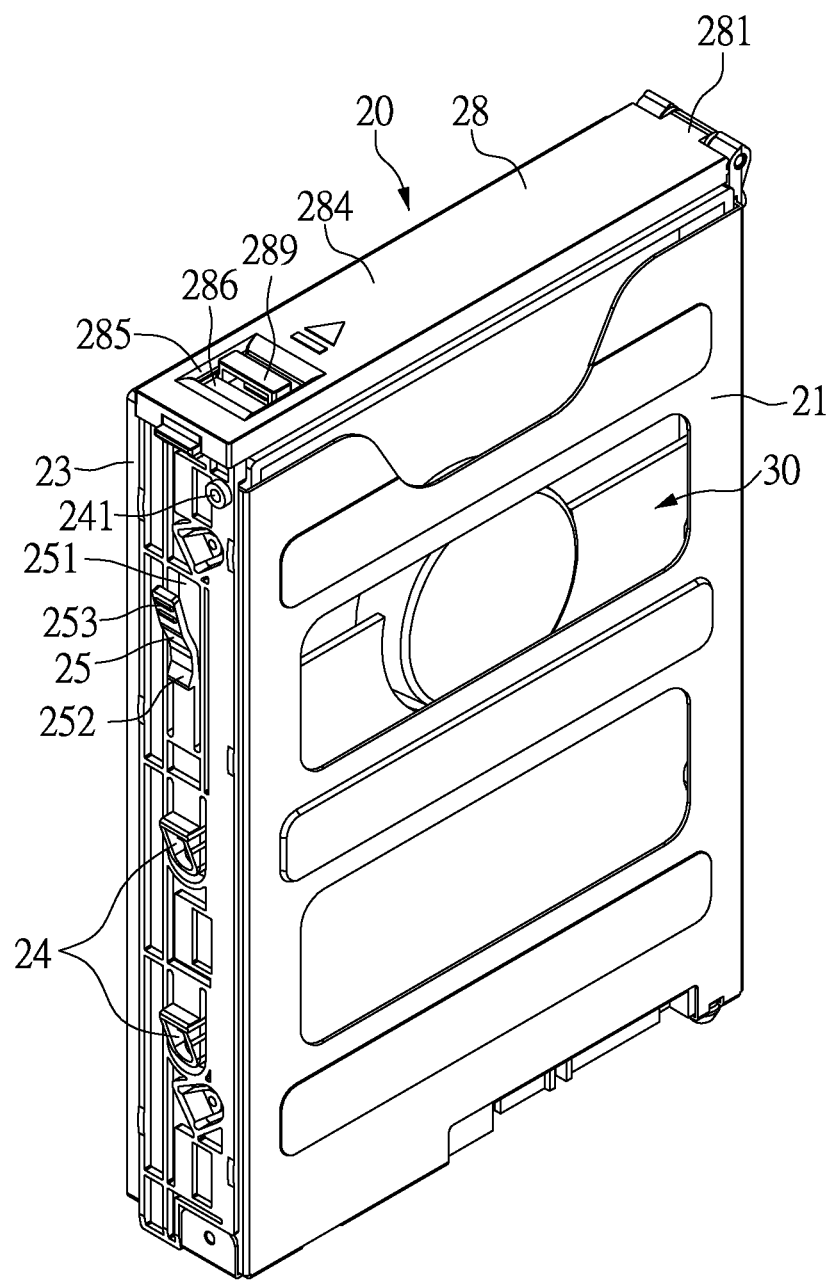
FIG. 3 shows a perspective view of a hard drive casing for a removable hard drive storage device according to the present disclosure.
Figure 4:
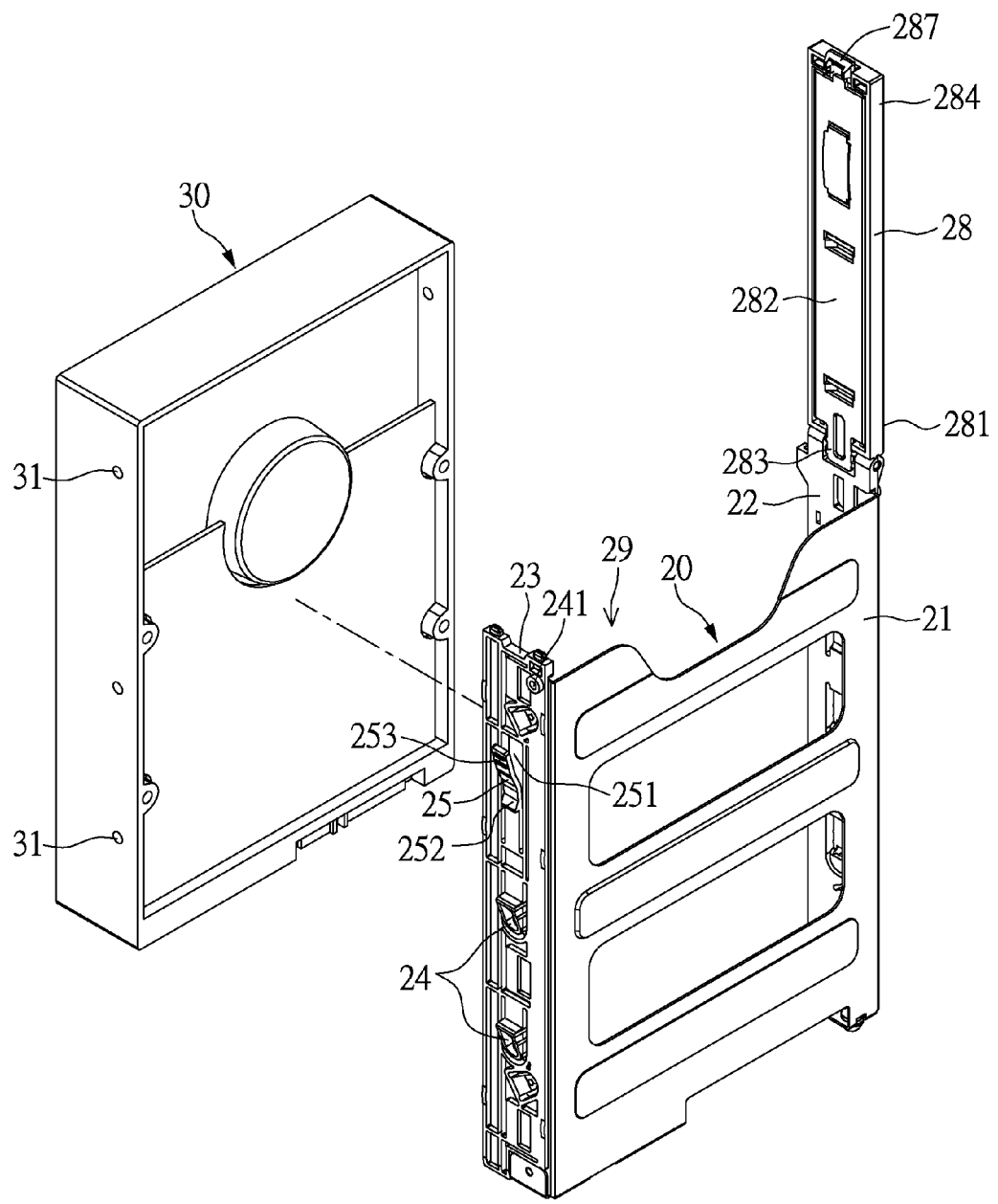
FIG. 4 shows a perspective view of a hard drive casing with an open cover plate and a hard drive removed from said hard drive casing according to the present disclosure.
Figure 5:
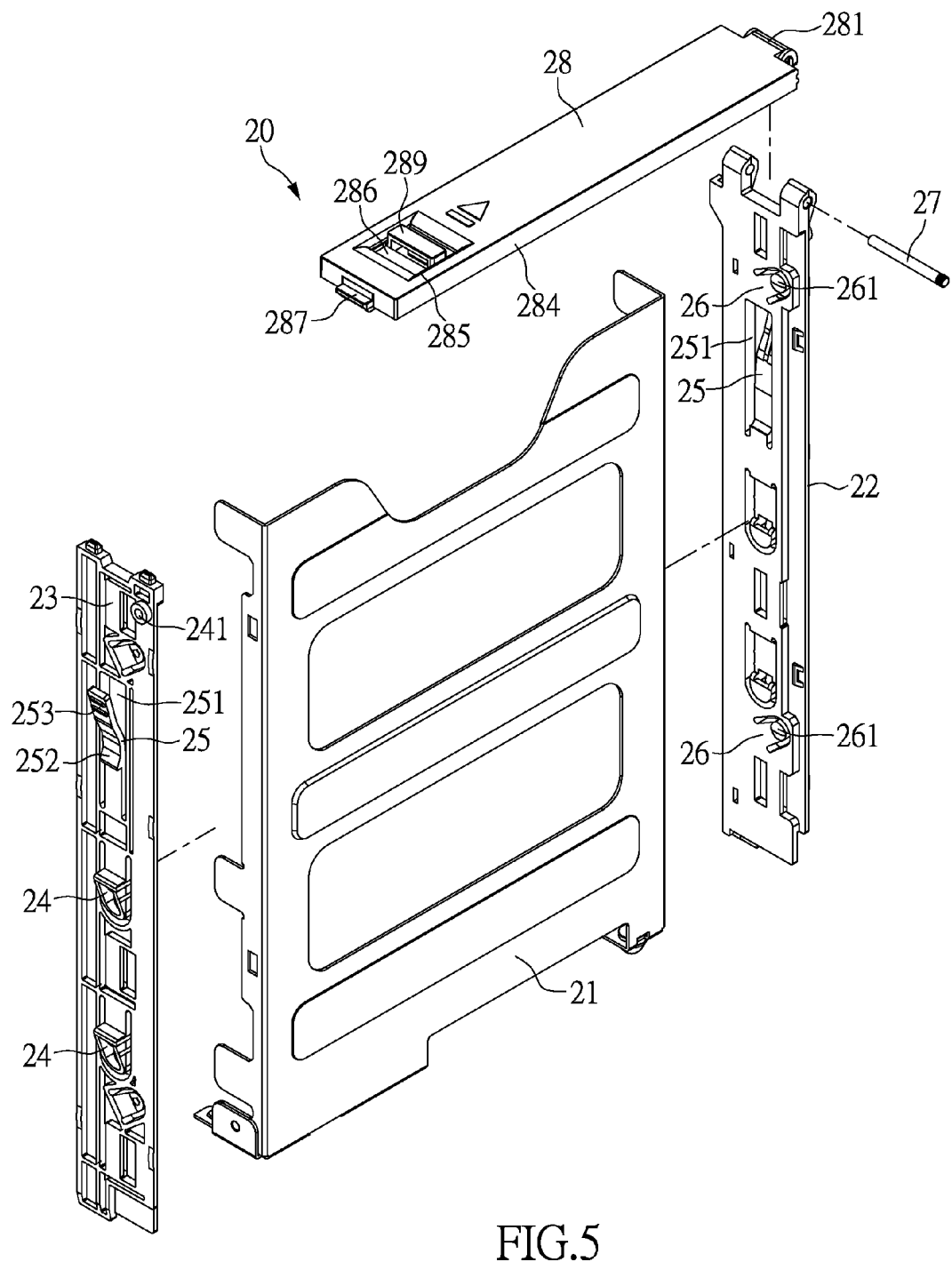
FIG. 5 shows an exploded view of a hard drive casing according to the present disclosure.

FIG. 3 to FIG. 5 show the structure of the hard drive casing 20 of the present disclosure. Each of the hard drive casings 20 has a tray 21, a first side plate 22, a second side plate 23 and a cover plate 28. The first side plate 22 and the second side plate 23 are respectively disposed at two sides of the tray 21. When the hard drive casing 20 is inserted into the accommodating space 13 of the housing 10, the first side plate 22 is proximal to the first partition board 11, and the second side plate 23 is proximal to the second partition board 12. The tray 21, the first side board 22, and the second side board 23 together define a hard drive accommodating slot 29. The hard drive accommodating slot 29 has an opening proximal to the upper end of the hard drive casing 20, for allowing a hard drive 30 to be disposed into the hard drive accommodating slot 29. The cover plate 28 is arranged at the opening of the hard drive accommodating slot 29, for closing the opening of the hard drive accommodating slot 29 to fix the hard drive 30 therein and protect the hard drive 30.

As shown in FIG. 7 and FIG. 8, the bottom of the hard drive casing 20 is formed with a plurality of cushion units 211. The cushion units 211 of the present embodiment are rubber pads disposed at the underside of the tray 21. As shown in FIG. 7, when the hard drive casing 20 is inserted into the accommodating space 13 of the housing 10, the cushion unit 211 contacts the server board 16 or the bottom of the housing 10, buffering the vibration of hard drive casing 20, thereby reducing the effect of vibration on and increasing the stability of the hard drive 30 during operation.

As shown in FIG. 4 and FIG. 5, the outer faces of the first side plate 22 and the second side plate 23 are protrudingly formed with guiding units 24 along their longitudinal direction. An expansion unit 25 is formed above the guiding units 24. In the present embodiment, the first side plate 22, the second side plate 23, the guiding units 24 and the expansion unit 25 are integrally formed as one body (such as injection molding) from an elastic material (such as plastic). Therefore, the guiding units 24 and the expansion unit 25 can be elastically deformed. As shown in FIG. 2, guiding grooves 14 are formed on the first partition board 11 and the second partition board 12. The positions of the guiding grooves 14 correspond to the positions of the guiding units 24 at two sides of the hard drive casing 20, and the width of the guiding grooves 14 is slightly greater than the width of the guiding units 24, such that the guiding units 24 can slidably engage the guiding grooves 14. As shown in FIG. 2, The guiding units 24 interact with the guiding grooves 14 on the first partition board 11 and the second partition board 12, to guide the hard drive casing 20 to move along the guiding grooves 14 in an up and down direction, such that the hard drive casing 20 can be moved down to a lowered position neighboring the bottom end of the accommodating space 13 (as shown in FIG. 7) or up to a raised position (as shown in FIG. 8).

As shown in FIG. 7, the hard drive casing 20 of the present disclosure is at the lowered position, and the hard drive accommodated therein is proximal to and can be connected to the connector 17 on the board 16, to achieve electric power and signal connection. As shown in FIG. 8, when the hard drive casing 20 is at the raised position, the hard drive 30 moves upward with the hard drive casing 20 and separates from the connector 17 on the board 16, the cover plate 28 of the hard drive casing 20 is at an open state, and the opening at the upper end of the hard drive casing 20 is higher than the housing 10, allowing the user to insert the hard drive 30 into the hard drive casing 20 or remove the hard drive 30 from the hard drive casing 20.

As shown in FIG. 7 and FIG. 8, the guiding unit 24 of the present disclosure protrudes from the outer faces of the first side plate 22 and the second side plate 23. The guiding units 24 are arranged at two sides of the hard drive casing 20, and the distance between the apex of two opposite guiding units 24 respectively on two sides of the hard drive casing 20 is greater than the distance between the first partition board 11 and the second partition board 12, such that when the hard drive casing 20 is accommodated within the accommodating space 13, the guiding units 24 on two sides of the hard drive casing 20 pass through the guiding grooves 14 and slightly protrude from the outer sides of the first partition board 11 and the second partition board 12. The guiding units 24 engage the guiding grooves 14, thereby guiding and restricting the movement of the hard drive casing 20 in the accommodating space 13.

As shown in FIG. 3 to FIG. 5, each of the guiding units 24 has a horizontal portion at its upper side, and a slanted face at its lower side, forming a wedge shape. The horizontal portions of the guiding units 24 extend outward and horizontally from the surfaces of the first side boards 11 and the second side boards 12. The slanted faces extend downward from the respective ends of the horizontal portions and slants toward the hard drive casing 20. When the hard drive casing 20 is inserted into the accommodating space 13, the slanted faces of the guiding units 24 abut the first partition board 11 and the second partition board 12, such that the guiding units 24 are pushed inward toward the hard drive casing 20, so that the guiding units 24 can slide into the guiding grooves 14.

The first side plate 22 and the second side plate 23 are each formed with at least one locking unit 241 at the upper end of its side face. As shown in FIG. 2, the upper edges of the first partition board 11 and the second partition board 12 are formed with a plurality of fixing grooves 18 for engaging the locking units 241. When the hard drive casing 20 is inserted to the bottom of the accommodating space 13, each of the locking units 241 is engaged to the respective fixing groove 18, to improve the precision for the fixture of the hard drive casing 20.

Figure 11:
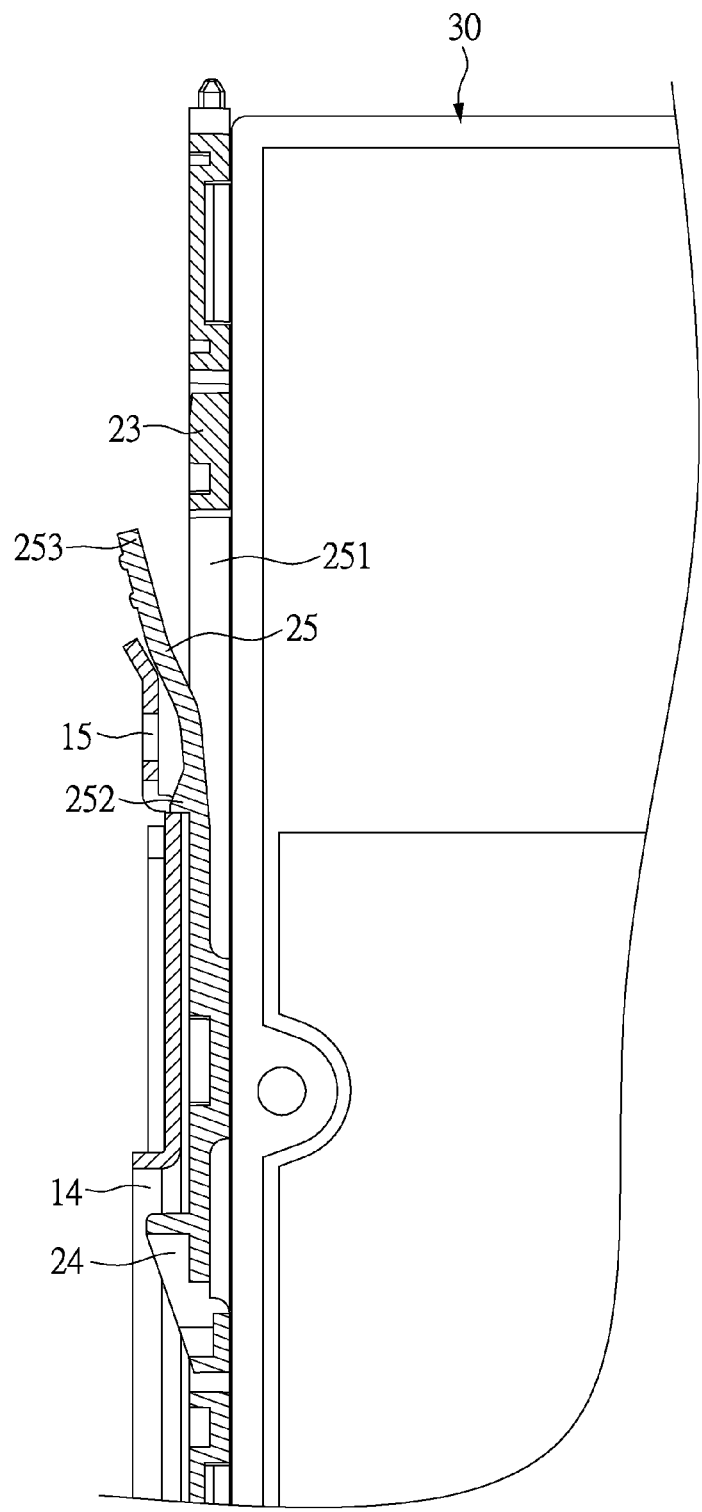
FIG. 11 shows an enlarged cross-sectional view of an expansion unit of a hard drive casing locked to a top edge of a first partition board or a second partition board according to the present disclosure.

The engagement between the guiding units 24 and the guiding grooves 14 can further restrict the raised position of the hard drive casing 20, such that the hard drive casing 20 cannot be completely separated from the accommodating space 13. As shown in FIG. 8 and FIG. 11, when the hard drive casing 20 is at the raised position, the horizontal portion of the upper guiding unit 24 at each of the side faces of the first side plate 22 and the second side plate 23 interferes with the upper edge of the respective guiding groove 14. The hard drive casing 20 is restricted and cannot be moved further upward, such that when the user removes the hard drive casing 20, the hard drive casing 20 cannot be unintentionally completely separated from the accommodating space 13, saving the trouble of reinserting the hard drive casing 20 into the accommodating space 13.

A technical feature of the present disclosure is the arrangement of the expansion units 25 at the top of the first side plate 22 and the second side plate 23 at two sides of the hard drive casing 20. As shown in FIG. 3 and FIG. 5, the expansion unit 25 and the guiding units 24 on each of the outer faces of the first side plate 22 and the second side plate 23 are arranged in a line. When the hard drive casing 20 is inserted into the accommodating space 13, each of the expansion units 25 is pressed by the first partition board 11 and the second partition board 12, and retracts inward to the surfaces of the first side plate 22 and the second side plate 23. The first side plate 22 and the second side plate 23 are each formed with an accommodating groove 251 at a position corresponding to the respective expansion unit 25. The accommodating groove 251 is slightly wider and longer than the expansion unit 25, such that the expansion unit 25 can be accommodated in the accommodating groove 251 when being pressed, such that the expansion unit 25 does not interfere with the downward motion of the hard drive casing 20. As shown in FIG. 8 and FIG. 11, the expansion unit 25 is elastic, so that when the hard drive casing 20 is raised and the expansion unit 25 is positioned at the height of the upper edge of the first partition board 11 and the second partition board 12, the elastic expansion unit 25 expands outward to engage the upper edge of the first partition board 11 or the second partition board 12, such that the hard drive casing 20 is fixed at the upper end of the accommodating space.

As shown in FIG. 8 and FIG. 11, the lower end of the outer face of the expansion unit 25 can be formed with a protruding block 252. When the hard drive casing 20 of the present disclosure is at the raised position, the height of the protruding block 252 is configured to engage the upper edge of the first partition board 11 or the second partition board 12, to prevent the hard drive casing 20 from lowering.

The ends of the expansion units 25 are each formed with an end portion 253. When the user intends to insert the hard drive casing 20 to the bottom of the accommodating space 13, he can press the end portions 253 of the expansion units 25 toward the first side plate 22 or the second side plate 23, such that the expansion unit 25 retracts to the first side plate 22 and the second side plate 23, such that the expansion units 25 do not interfere with the downward motion of the hard drive casing 20.

When the hard drive casing 20 is pulled up to the raised position, the fixing function of the expansion units 25 keeps the hard drive casing 20 at the raised position and prevents the hard drive casing 20 from moving downward, to facilitate the user to install or replace hard drives.

Figure 6:
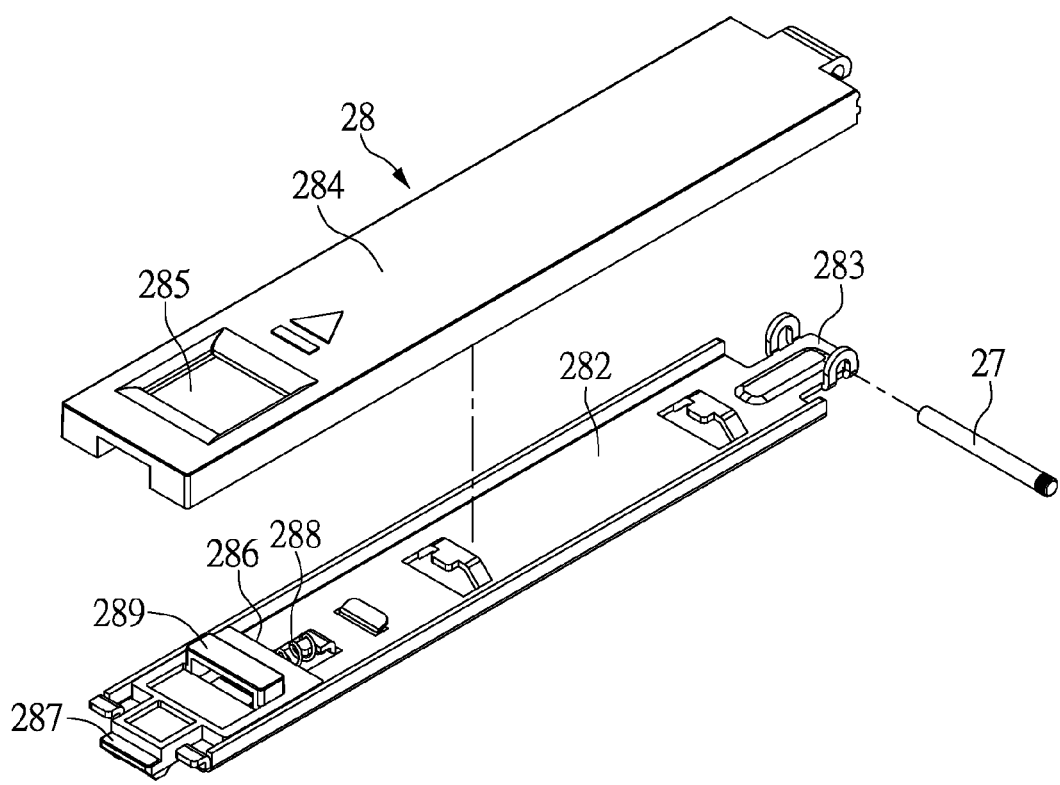
FIG. 6 shows an exploded view of a cover plate of a hard drive casing according to the present disclosure.

The opening at the upper end of the hard drive casing 20 of the present disclosure is arranged with the cover plate 28. The cover plate 28 can fix the positions of the hard drive casing 20 and the hard drive 30, and close said opening to increase safety when the hard drive 30 is in use. As shown in FIG. 4, FIG. 5 and FIG. 6, the cover plate 28 of the present disclosure is formed by a frame 282 and a top lid 284. The top lid 284 covers the top of the frame 282. One end of the cover plate 28 is formed with a pivot connection 281 for pivotally connecting to the top end of the first side plate 22 or the second side plate 23 (as shown in FIG. 5).

The cover plate 28 has an additional function. As shown in FIG. 2 and FIG. 8, when the user intends to replace the hard drive 30, the cover plate 28 of the hard drive casing 20 needs to be lifted. When the cover plate 28 is open, the cover plate 28 can serve as a handle for the user to hold, by which the user can apply force to pull out the hard drive casing 20 from the accommodating space 13.

The end of the cover plate 28 proximal to the pivot connection 281 is formed with a first engagement portion 283 protruding outward. In the present embodiment, the first engagement portion 283 is integrally formed as one body with the frame 282 and extends outward from the end thereof at the pivot connection 281. A sliding block 286 is disposed proximal to an end of the cover plate 28 opposite the first engagement portion 283. The sliding block 286 is slidably disposed in the seam between the frame 282 and the top lid 284. An end of the sliding block 286 proximal to the edge of the cover plate 28 is formed with a second engagement portion 287, one end of which protrudes from the cover plate 28. And elastic unit 288 is disposed between the sliding block 286 and the frame 282, for providing an elastic force to push the sliding block 286 outward, such that the second engagement portion 287 protrudes from the outer edge of the cover plate 28.

Figure 9:
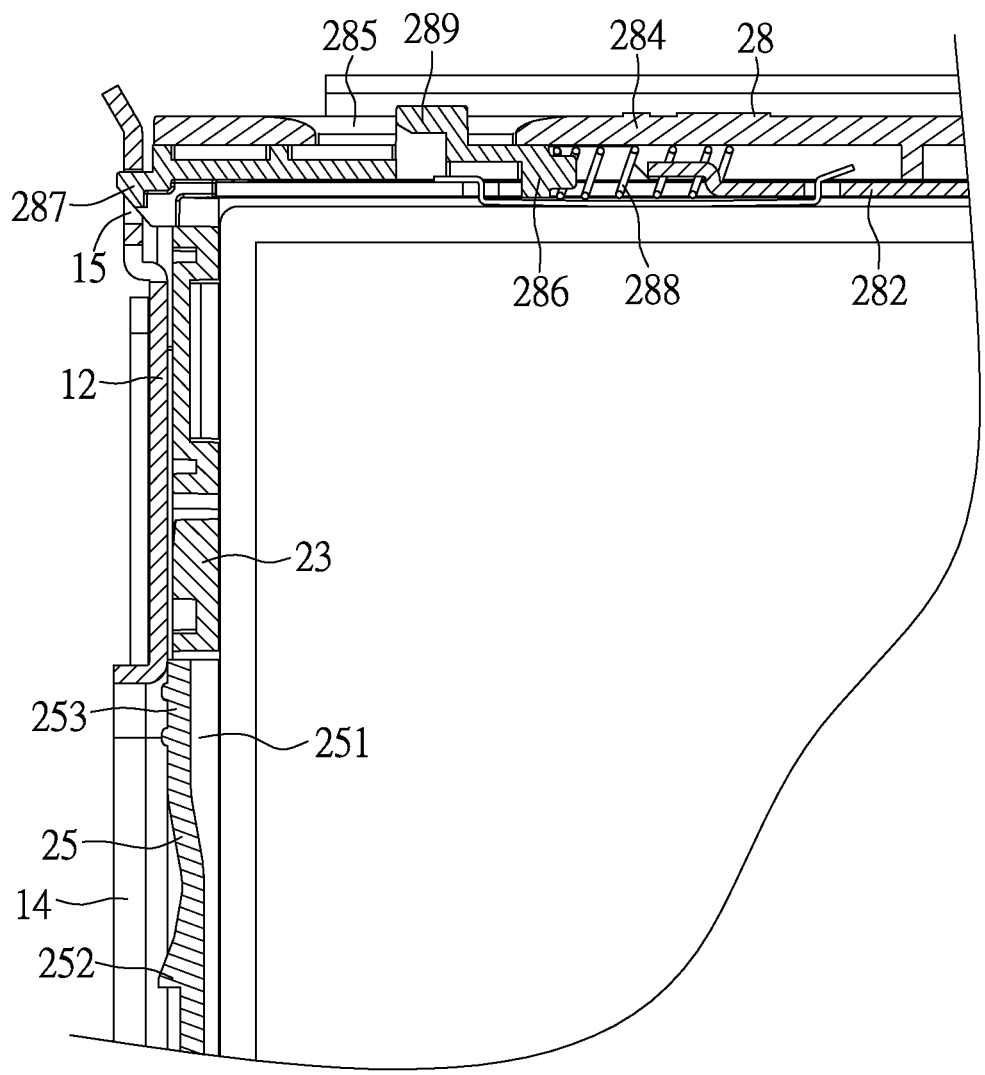
FIG. 9 shows an enlarged cross-sectional view of an engagement between a second engagement portion of a hard drive casing and an engagement hole of the second partition board according to the present disclosure.
Figure 10:
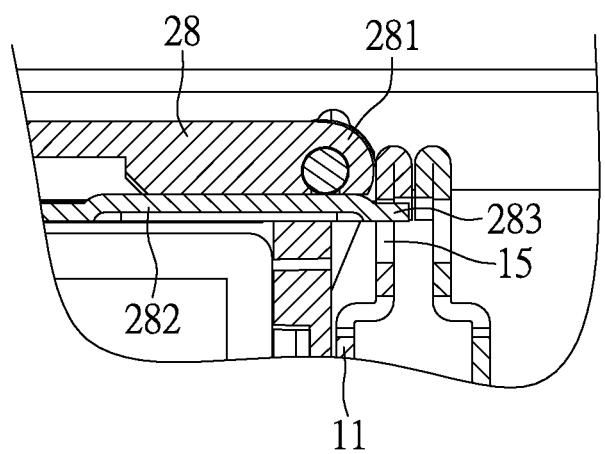
FIG. 10 shows an enlarged cross-sectional view of an engagement between a first engagement portion of a hard drive casing and an engagement hole of the second partition board according to the present disclosure.

As shown in FIG. 2, FIG. 9 and FIG. 10, the upper edges of the first partition board 11 and the second partition board 12 each is formed with a plurality of engagement holes 15 each positioned above one of the guiding grooves 14. As shown in FIG. 9 and FIG. 10, when the hard drive casing 20 is inserted to the bottom of the accommodating space 13, and the cover plate 28 of each of the hard drive casings 20 is closed upon the respective hard drive casing 20, the first engagement portion 283 and the second engagement portion 287 at two ends of the cover plate 28 respectively engage the engagement holes 15 at the upper edges of the first partition board 11 and the second partition board 12.

The cover plates 28 of the hard drive casings 20, through the engagement of the first engagement portion 283 and the second engagement portion 287 to the engagement holes 15 of the first partition board 11 and the second partition board 12, can stop the hard drive casing 20 from separating from the bottom of the accommodating space 13, and securely press the hard drive 30 within the hard drive casing 20, thereby achieving the objective of fixing the hard drive 30 and safety when operating the hard drive 30.

The sliding block 286 of the present disclosure is slidably accommodated between the frame 282 and the top lid 284. An opening 285 is formed at the top lid 284 over the sliding block 286, such that the sliding block 286 is partially exposed by the opening 285. The top face of the sliding block 286 is formed with a trigger unit 289, exposed from the opening 285 of the top lid 284, such that the user can use a finger to push the trigger piece 289 for driving the sliding block 286 to move back and forth.

The second engagement portion 287 protrudes from an outer side of the sliding block 286, and has a slanted face at its underside. When the hard drive casing 20 is inserted to the bottom of the accommodating space 13 and the cover plate 28 covers the top of the hard drive casing 20, the slanted face of the second engagement portion 287 can abut the top edge of the second partition board 12 (or the first partition board 11), driving the second engagement portion 287 and the sliding block 286 to retract, such that the second engagement portion 287 can slide into the engagement hole at the top edge of the second partition board 12 (or the first partition board 11).

When the user intends to remove the hard drive casing 20 from the accommodating space 13, the sliding block 286 must be pushed toward the center of the cover plate 28, such that the second engagement portion 287 is separated from the engagement hole at the top edge of the second partition board 12 (or the first partition board 11), and then lift the entire cover plate 28 (as shown in FIG. 2 and FIG. 8), and then pull the hard drive casing 20 upward, such that the hard drive 30 accommodated in the hard drive casing 20 is separated from the connector 17 on the board 16. The hard drive casing 20 is then pulled up to the raised position for replacing the hard drive 30.

In order to achieve the object of screwless fixture, as shown in FIG. 4 and FIG. 5, a plurality of elastic pieces 26 can be disposed at inner faces of the first side plate 22 and the second side plate 23 of the hard drive casing 20. Each of the elastic pieces 26 has a fixing protrusion 261 positioned at locations corresponding to a position of a respective screw hole 31 at a side face of the hard drive 30 accommodated in the hard drive casing 20. Therefore when the hard drive 30 is disposed in the hard drive accommodating slot 29 of the hard drive casing 20, the fixing protrusions 261 of the elastic pieces 26 respectively engage the screw holes 31 at two sides of the hard drive 30, thereby fixing the hard drive 30 within the hard drive accommodating slot 29.

Second Embodiment

Figure 12:
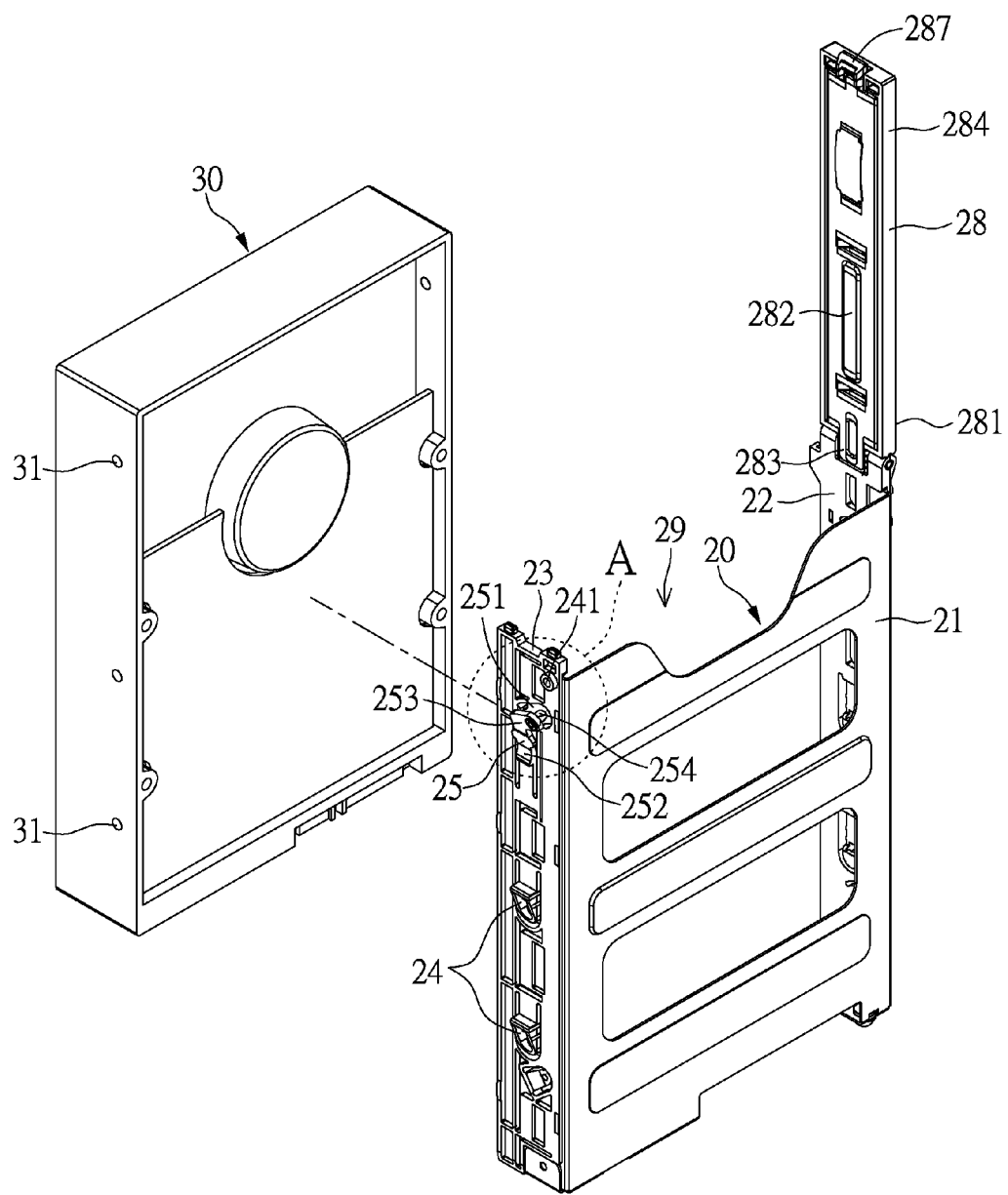
FIG. 12 shows a perspective view of a hard drive casing with an open cover plate and a hard drive removed from said hard drive casing according to a second embodiment of the present disclosure.
Figure 13:
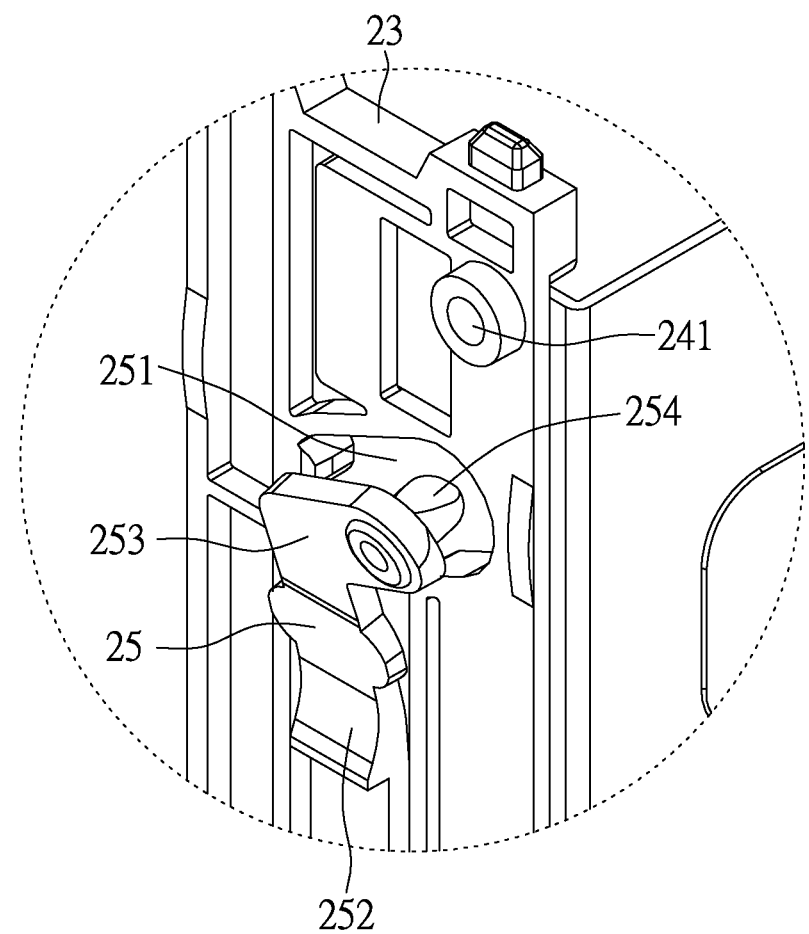
FIG. 13 shows an enlarged perspective view of an expansion unit of a hard drive casing according to a second embodiment of the present disclosure.
Figure 14:
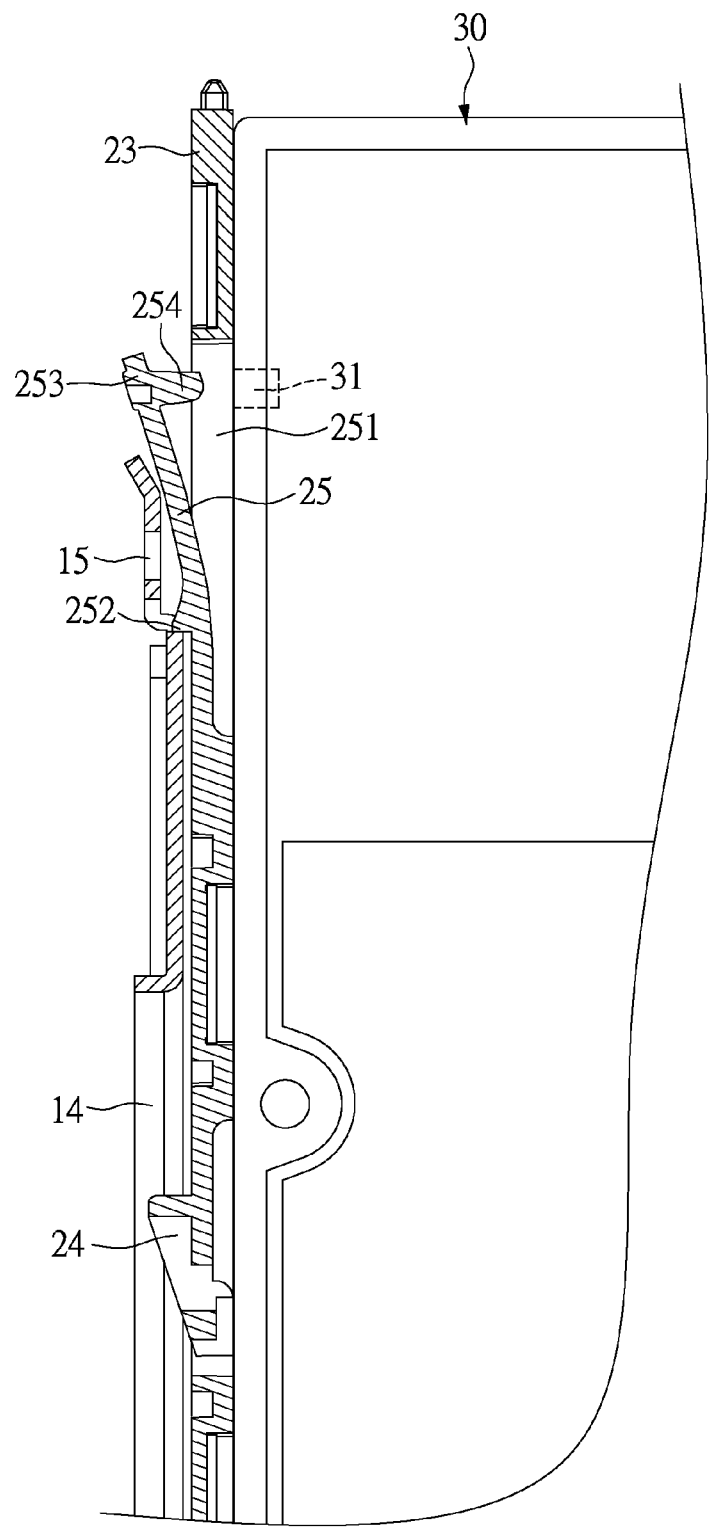
FIG. 14 shows an enlarged cross-sectional view of an expansion unit of a hard drive casing locked to a top edge of a first partition board or a second partition board according to a second embodiment of the present disclosure.

As shown in FIG. 12 to FIG. 14, the main difference between a second embodiment of the present disclosure and the previous embodiment lies in the structure of the expansion unit 25. The function of the expansion unit 25 of the second embodiment is similar to that of the first embodiment, namely for fixing the hard drive casing 20 at the raised position projecting out of the top of the accommodating space 13 of the housing 10, to facilitate replacing or installing of hard drives.

As shown in FIG. 13, the end portion 253 of the expansion unit 25 is curved. The accommodating groove 251 formed on the first side plate 22 and the second side plate 23 has shapes corresponding to that of the expansion unit 25. The inner face of the end portion 253 of the expansion unit 25 has a fixing pin 254 whose position corresponds to one of the screw holes 31 at one of the sides of the hard drive 30. As shown in FIG. 14, the fixing pin 254 and the screw hole 31 are aligned, therefore when the hard drive casing 20 is inserted into the accommodating space 13 of the housing 10, the two expansion units 25 are pressed inward by the first partition board 11 and the second partition board 12 of the housing 10, and the fixing pins 254 at the ends of the expansion units 25 are inserted into the screw holes 31 of the hard drive 30 for fixing the hard drive in the hard drive casing 20.

The expansion unit 25 can elastically expand outward. Therefore when the hard drive casing 20 is raised, such that the expansion units 25 is separated from the upper edge of the first partition board 11 and the second partition board 12, the elastic force of the expansion units 25 drive the fixing pins 254 outward and away from the screw holes 31 of the hard drive 30, such that the hard drive 30 is no longer restricted by the fixing pin 254 and can be retrieved from the hard drive casing 20.

Figure 15:
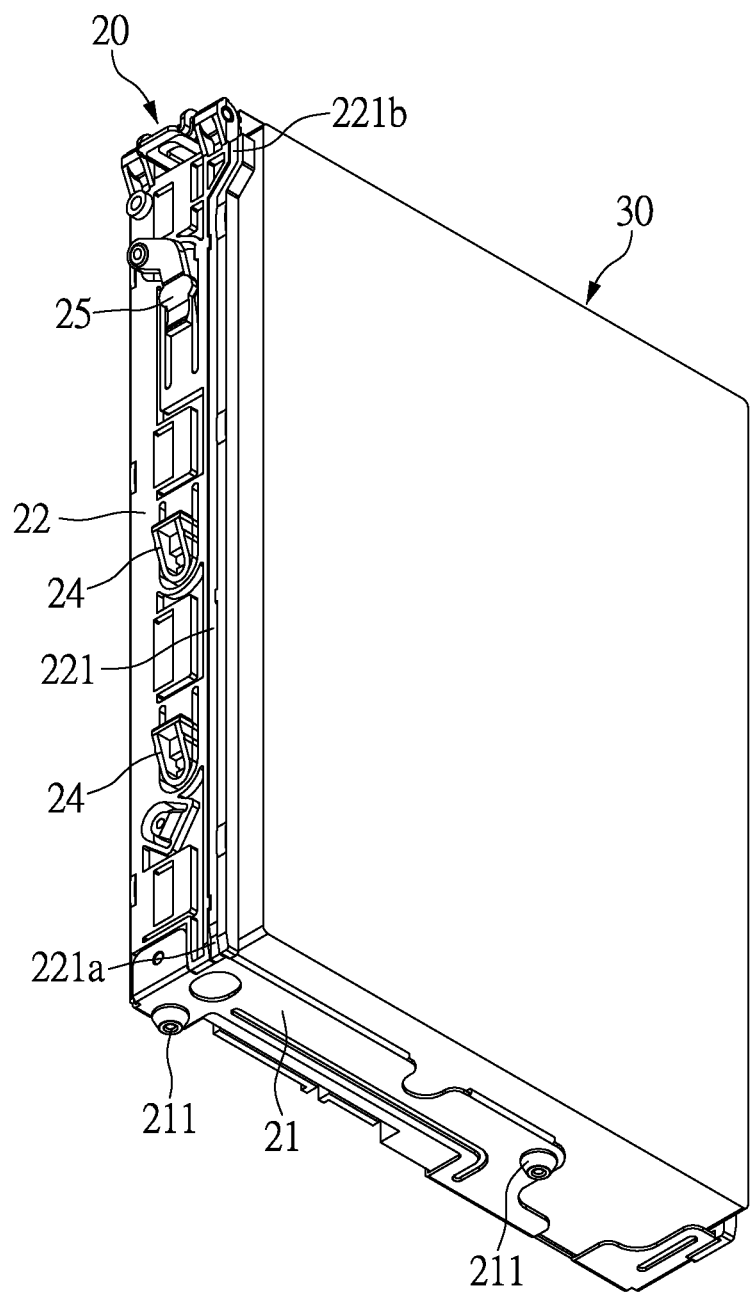
FIG. 15 shows a perspective view of an expansion unit of a hard drive casing according to a second embodiment of the present disclosure taken by another angle of view.

Additionally, as shown in FIG. 15, in the second embodiment, a light guiding unit 221 can be disposed at the first side plate 22. The light guiding unit 221 is a light guiding strip made of a light guiding material (e.g. acrylic). The light guiding unit 221 has a light entrance end 221a proximal to the bottom of the hard drive casing 20, and a light exit end 221b proximal to the top of the hard drive casing 20. It must be mentioned that, even though the light guiding unit 221 of the present embodiment is disposed on the first side plate 22, the light guiding unit 221 can also be disposed on the second side plate 23 and achieve a similar effect. The light guiding units 221 is configured to transmit light emitted by a lighting unit (e.g. an LED) on the server board 16, from the light entrance end 221a to the light exit end 221b, such that the user can identify from the top of the hard drive casing the operation status of the hard drive 30 as indicated by lighting unit on the server board 16, and accordingly carry out maintenance work.

The fixing function of the fixing pins 254 at the ends of the expansion units 25 of the second embodiment can secure the position of the hard drive 30, achieving a preferred effect of protection and fixture.

Advantages of the Embodiments

In summary of the above, the present disclosure has the following advantages. Through interaction between the expansion units 25 of the hard drive casing and the first and second partition boards 11, 12 of the housing 10, the hard drive casing 20 of the present disclosure can be fixed at an upper opening of the housing 10 and protruding therefrom, facilitating replacement of hard drives.

Engagement between the guiding units 24 and the guiding grooves 14 restricts the height to which the hard drive casing 20 can be raised, preventing the hard drive casing 20 from being completely separated from the accommodating space 13, therefore saving the trouble of reinserting the hard drive casing 20 into the accommodating space 13 and the unpredictable damages which may occur thereby.

Through fixture of the hard drive 30 by the fixing protrusions 261 of the elastic pieces 26 of the hard drive casing 20, and the fixture of the hard drive in the hard drive accommodating slot 29 of the hard drive casing 20 by the cover plate 28, the hard drive casing 20 of the present disclosure does not require screws to fix the hard drive 30 in the hard drive accommodating slot 29.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A removable hard drive storage device, comprising:
a housing having at least one first partition board, at least one second partition board parallel to the first partition board, wherein the first partition board and the second partition board define an accommodating space having an opening end and a bottom end, the opening end is defined as up and the bottom end is defined as down;
a plurality of hard drive casings configured to be slidably accommodated in the accommodating space and each having a tray, a first side plate on one side of the tray and a second side plate at another side of the tray, wherein the tray, the first side plate and the second side plate define a hard drive accommodating slot for accommodating one hard drive, the first side plate and the second side plate are respectively proximal to the first partition board and the second partition board, an upper end of the hard drive casing is formed with an opening, and a cover plate is disposed at the opening;
a plurality of guiding units protruding from outer faces of the first side plate and the second side plate, wherein the guiding units are aligned along a length-wise direction of the first side plate and the second side plate;
a plurality of guiding grooves formed at the first partition board and the second partition board and corresponding to the positions of the guiding units, wherein the guiding units are configured to slidably engage the guiding grooves; and
a plurality of expansion units disposed at two side faces of the first side plate and the second side plate and above the guiding units, wherein a lower end of each of the expansion units is connected to an outer surface of the first side plate or the second side plate, another end of each of the expansion units slantedly extends upward and away from the surface of the first side plate and the second side plate; wherein
the expansion units have elasticity, when the hard drive casing is moved upward away from the accommodating space and the height of the expansion unit is greater than upper edges of the first partition board and the second partition board, the expansion units each expand outward through elasticity and abut the upper edge of the first partition board and the second partition board, and the hard drive casing is configured to be safe from moving downward.

2. The removable hard drive storage device according to claim 1, wherein an inner face of an end portion of each of the expansion units is formed with a fixing pin extending inward, the fixing pins correspond respectively to screw holes at two sides of the hard drive, and when the expansion units abut the first side plate and the second side plate, the fixing pins are respectively inserted into the screw holes of the hard drive.

3. The removable hard drive storage device according to claim 2, wherein upper ends of the first side plate and the second side plate are each formed with at least one locking unit, the upper edges of the first partition board and the second partition board are each formed with a plurality of fixing grooves corresponding to and configured to engage the locking units, and when the hard drive casing is inserted to the bottom of the accommodating space, each of the locking units is locked to a respective fixing groove.

4. The removable hard drive storage device according to claim 3, wherein an upper end of each of the guiding units has a horizontal portion extending horizontally from the surface of the first side plate or the second side plate, when the hard drive casing is lifted upward from the accommodating space, the guiding units move upward with the hard drive casing, and when the horizontal portions of the guiding units abut an upper edge of the guiding groove, the engagement between the horizontal portion of the guiding units and the upper edge of the guiding groove prevents the hard drive casing from further being lifted upward.

5. The removable hard drive storage device according to claim 4, wherein one end of each of the cover plates has a pivot connection, and the pivot connections are each connected to the upper ends of the first side plate or the second side plate.

6. The removable hard drive storage device according to claim 5, wherein a first engagement portion is formed at the cover plate proximal to the pivot connection, a sliding block is disposed at another end of the cover plate, one side of the sliding block has a second engagement portion, the second engagement portion protrudes from an end of the cover plate opposite to the pivot connection; the upper edges of the first partition board and the second partition board are each formed with a plurality of engagement holes, the position of each of the first engagement portions and the second engagement portions correspond to the position of the respective engagement hole, when the hard drive casing is disposed at the bottom of the accommodating space and the cover plate is closed upon the opening of the hard drive casing, the first engagement portions and the second engagement portions respectively engage the engagement holes, and the hard drive casing cannot be separated from the accommodating space.

7. The removable hard drive storage device according to claim 6, wherein the sliding block is slidably disposed on the cover plate, an elastic unit is disposed between the sliding block and the cover plate and drives the sliding block toward an end of the cover plate and protrudes therefrom, an underside of the second engagement portion has a slanted face configured to engage the first partition board or the second partition board and push the second engagement portion and the sliding block into the cover plate.

8. The removable hard drive storage device according to claim 7, wherein the cover plate includes a frame and a top lid, the top lid covers the frame, the sliding block is accommodated between the frame and the top lid, a trigger unit is disposed at a top face of the sliding block, an opening is formed at the cover plate at a position corresponding to the trigger unit for exposing the trigger unit.

9. The removable hard drive storage device according to claim 8, wherein a plurality of elastic pieces is disposed at inner faces of the first side plate and the second side plate of the hard drive casing, each of the elastic pieces has a fixing protrusion positioned at locations corresponding to the position of the respective screw hole at a side face of the hard drive accommodated in the hard drive accommodating slot, for fixing the hard drive in the hard drive accommodating slot.

10. The removable hard drive storage device according to claim 1, wherein at least one of the first side plate and the second side plate is formed with a light guiding unit, and the light guiding unit has a light entrance end proximal to the bottom of the hard drive casing, and a light exit end proximal to the top of the hard drive casing.

11. A removable hard drive storage device applicable to a housing having at least two parallel partition boards, wherein any two neighboring partition boards define an accommodating space therebetween, and the removable hard drive storage device comprises:

a plurality of hard drive casings slidably accommodated in the accommodating space, two sides of each of the hard drive casing are respectively proximal to the two partition boards, an opening is formed at an upper end of the hard drive casing for allowing insertion of a hard drive into the hard drive casing;

a cover plate having a pivot connection pivotally connected to a side of the upper end of the hard drive casing;

a plurality of guiding units protruding from two sides of the hard drive casing;

a plurality of guiding grooves formed at the partition boards and corresponding to the positions of the guiding units, wherein the guiding units is configured to slidably engage the guiding grooves; and a plurality of expansion units disposed at two sides of hard drive casing and above the guiding units, wherein another end of each of the expansion units slantedly extends upward and away from the surface of the first side plate and the second side plate, the expansion units have elasticity, when the hard drive casing is moved upward away from the accommodating space and the height of the expansion unit is greater than upper edges of the first partition board and the second partition board, the expansion units each expand outward through elasticity and abut the upper edge of the partition board, and the hard drive casing is configured to be safe from moving downward.

12. The removable hard drive storage device according to claim 11, wherein the pivot connection of the cover plate has a first engagement portion, an end of the cover plate opposite the pivot connection has a second engagement portion, the first engagement portion and the second engagement portion respectively extend outward from two ends of the cover plate, the second engagement portion is slidably disposed on the cover plate; a plurality of engagement holes is formed at the upper edge of the partition board and corresponds to the positions of the first engagement portions and the second engagement portions, when any of the hard drive casings is accommodated at the bottom of the accommodating space, the first engagement portions and the second engagement portions respectively engage the engagement holes.

13. The removable hard drive storage device according to claim 12, wherein an inner face of an end portion of each of the expansion units is formed with a fixing pin extending inward, the fixing pins correspond respectively to screw holes at two sides of the hard drive, and when the expansion units abut the first side plate and the side plate, the fixing pins are respectively inserted into the screw holes of the hard drive.

14. The removable hard drive storage device according to claim 11, wherein each of the hard drive casings is formed with a plurality of cushion units at a bottom portion thereof, for buffering effect of vibration on the hard drive during operation.

15. The removable hard drive storage device according to claim 11, wherein at least one of the first side plate and the second side plate is formed with a light guiding unit, and the light guiding unit has a light entrance end proximal to the bottom of the hard drive casing, and a light exit end proximal to the top of the hard drive casing.

* * * * *